United States Patent [19]
Yagisawa et al.

[11] Patent Number: 5,890,182
[45] Date of Patent: Mar. 30, 1999

[54] SENTENCE PROCESSING METHOD AND APPARATUS

[75] Inventors: Tsuyoshi Yagisawa, Ebina; Minoru Fujita, Yokohama, both of Japan

[73] Assignee: Canon Kabushiki Kaisha, Tokyo, Japan

[21] Appl. No.: 607,642

[22] Filed: Feb. 27, 1996

[30] Foreign Application Priority Data

Feb. 28, 1995 [JP] Japan .................................. 7-040014

[51] Int. Cl.$^6$ ...................................................... G06F 17/28
[52] U.S. Cl. ......................... 707/535; 707/532; 707/533; 707/530; 704/8
[58] Field of Search .................................. 707/532, 533, 707/535, 530, 500; 704/8, 9, 10

[56] References Cited

U.S. PATENT DOCUMENTS

| | | | |
|---|---|---|---|
| 4,674,065 | 6/1987 | Lange et al. | 364/900 |
| 5,258,909 | 11/1993 | Damerau et al. | 364/419.22 |
| 5,289,376 | 2/1994 | Yokogawa | 364/419.11 |
| 5,369,574 | 11/1994 | Masegi et al. | |

OTHER PUBLICATIONS

Linzmayer, Owen W.; "Language Master"; MacUser; v6 n1; p. 92(3), Jan. 1990.

Primary Examiner—Joseph H. Feild
Assistant Examiner—Motilewa Good-Johnson
Attorney, Agent, or Firm—Fitzpatrick, Cella, Harper & Scinto

[57] ABSTRACT

In a sentence processing apparatus, a possibly erroneous word is extracted from a sentence by analyzing the sentence in accordance with predetermined grammar and predetermined information on words, information on suggested words which correspond to the extracted possibly erroneous word is extracted from the predetermined information on words, and information on the extracted possibly erroneous word and the information on the corresponding extracted suggested words are displayed. Accordingly, the information on the possibly erroneous word in the sentence can be briefly displayed, thus a user can easily edit the sentence in response to the displayed information.

43 Claims, 9 Drawing Sheets

| WORD NO. | REPRESENTATION | PRONUNCIATION | PART OF SPEECH | RELEVANT WORD INFORMATION (MARK) | ... | INFORMATION ON SUGGESTED WORDS |
|---|---|---|---|---|---|---|
| ⋮ | ⋮ | ⋮ | ⋮ | ⋮ | ⋮ | ⋮ |
| W002301 | 影像 | えいぞう | 名詞 | ◯ | ⋮ | 映像 |
| ⋮ | ⋮ | ⋮ | ⋮ | ⋮ | ⋮ | ⋮ |
| W002303 | 映像 | えいぞう | 名詞 | ◯ | ⋮ | 影像 |
| ⋮ | ⋮ | ⋮ | ⋮ | ⋮ | ⋮ | ⋮ |
| W002305 | 営造 | えいぞう | サ変 | ✕ | ⋮ | — |
| ⋮ | ⋮ | ⋮ | ⋮ | ⋮ | ⋮ | ⋮ |

◯ MEANS THAT THERE IS A RELEVANT WORD

✕ MEANS THAT THERE IS NO RELEVANT WORD

— MEANS NO INFORMATION

FIG. 5

| WORD NO. | REPRESENTATION | PRONUNCIATION | PART OF SPEECH | RELEVANT WORD INFORMATION (MARK) | ... | INFORMATION ON SUGGESTED WORDS |
|---|---|---|---|---|---|---|
| ... | ... | ... | ... | ... | ... | ... |
| W002301 | 影像 | えいぞう | 名詞 | ○ | ... | 映像 |
| ... | ... | ... | ... | ... | ... | ... |
| W002303 | 映像 | えいぞう | 名詞 | ○ | ... | 影像 |
| ... | ... | ... | ... | ... | ... | ... |
| W002305 | 営造 | えいぞう | サ変 | × | ... | — |
| ... | ... | ... | ... | ... | ... | ... |

○ MEANS THAT THERE IS A RELEVANT WORD
× MEANS THAT THERE IS NO RELEVANT WORD
— MEANS NO INFORMATION

FIG. 6

| WORD NO. | PRONUNCIA-TION | REPRESENTA-TION | PART OF SPEECH | MEANING NO. | MEANING | USAGE | SYNONYMS | ... |
|---|---|---|---|---|---|---|---|---|
| ... | ... | ... | ... | ... | ... | ... | ... | ... |
| S02301 | えいぞう | 映像 | 名詞 | (1) | 物の表面に映し出された形や姿。 | -がみだれる | | ... |
| | | | | (2) | 頭の中にうかんだものの姿や様子。 | 父の- | イメージ | ... |
| ... | ... | ... | ... | ... | ... | ... | ... | ... |
| S02303 | えいぞう | 影像 | 名詞 | (1) | 人や物の姿や形。 | 夢の- | 映像 | ... |
| | | | | (2) | 絵画などで表した神仏や人の姿や形。 | キリストの- | 肖像 | ... |
| ... | ... | ... | ... | ... | ... | ... | ... | ... |

FIG. 7

The house built on lock is large.  —7a

↓ SENTENCE CHECKING PROCESS

| No. | PICKED-UP WORD | POSITION (START POSITION OF WORD) | LENGTH (NUMBER OF CHARACTERS) | MEANINGS AND USAGE | | 7b |
|---|---|---|---|---|---|---|
| | | | | PICKED-UP WORD | SUGGESTED WORD | |
| 1 | lock | 20 | 4 | | | |

↓ MEANING AND USAGE SEARCH AND EDITING PROCESS

| No. | PICKED-UP WORD | POSITION (START POSITION OF WORD) | LENGTH (NUMBER OF CHARACTERS) | MEANINGS AND USAGE | | 7c |
|---|---|---|---|---|---|---|
| | | | | PICKED-UP WORD | SUGGESTED WORD | |
| 1 | lock | 20 | 4 | S03701 | S06503 | |

↓ CHECK RESULT DISPLAY PROCESS

2000 — lock  a device for fastening a door, safe, etc.
rock  the solid part of the crust ; this material ;...

7d

The house built on lock is large.

(SENTENCE DISPLAY PART)

lock [lák] noun
 (1) a device for fastening a door, safe, etc.
  : fasten a lock
  (syn.) latch
 (2) the part of a gun by means of which it is fired
 (3) an enclosed place in a canal or dock where the level of the water can be changed by letting water in or out, in order to raise or lower ships : lock gate

2001

(MEANING AND USAGE DISPLAY PART)

FIG. 8

| WORD NO. | SPELLING | PRONUNCIATION | PART OF SPEECH | RELEVANT WORD INFORMATION (MARK) | ... | INFORMATION ON SUGGESTED WORDS |
|---|---|---|---|---|---|---|
| ... | ... | ... | ... | ... | ... | ... |
| W003701 | lock | lák | noun | ○ | ... | rock |
| ... | ... | ... | ... | ... | ... | ... |
| W006503 | rock | rák | noun | ○ | ... | lock |
| ... | ... | ... | ... | ... | ... | ... |
| W006513 | ruck | rÁk | noun | × | ... | — |
| ... | ... | ... | ... | ... | ... | ... |

○ MEANS THAT THERE IS A RELEVANT WORD
× MEANS THAT THERE IS NO RELEVANT WORD
— MEANS NO INFORMATION

FIG. 9

| WORD NO. | SPELLING | PRONUNCIA-TION | PART OF SPEECH | MEANING NO. | MEANING | USAGE | SYNONYMS | ... |
|---|---|---|---|---|---|---|---|---|
| ... | ... | ... | ... | ... | ... | ... | ... | ... |
| W003701 | lock | lák | noun | (1) | a device for fastening a door safe, etc. | fasten a lock | latch | |
| | | | | (2) | the part of a gun by means of which it is fired | | | |
| | | | | (3) | an enclosed place in a canal or dock where the level of the water can be changed by letting water in or out, in order to raise or lower ships | lock gate | | |
| ... | ... | ... | ... | ... | ... | ... | ... | |
| W006503 | rock | rák | noun | (1) | the solid part of the crust; this material; a large mass of stone; a large piece of stone; a boulder | This building's foundations stand on rock. | stone | |
| | | | | (2) | a portion of rock in the sea | The ship was wrecked on the rocks. | | |
| | | | | (3) | any circumstance causing failure, disagreement, etc. | Religious prejudice was the rock upon which the measure was wrecked. | | |
| | | | | (4) | something firm like a rock; a support; a defence | Christ is called the rock of Ages. | | |
| | | | | (5) | one of various kinds of hard sweets or candy | almond rock | | |
| ... | ... | | | ... | ... | | | ... |

6

SENTENCE PROCESSING METHOD AND APPARATUS

BACKGROUND OF THE INVENTION

The present invention relates to a sentence processing method and apparatus and, more particularly, to a sentence processing method and apparatus for detecting a possible error in a sentence and identifying a possible correction if necessary.

A general sentence processing apparatus which corrects a sentence, analyzes the sentence, detects a part thereof, including a word for which a homophone is often misused, on the basis of the analysis, and identifies the detected word, or identifies the detected word as well as displays suggested words, or provides information, such as examples of the meanings and usage of the detected word and the suggested words. An example of a display arrangement of the words and their meanings and usage is shown below.

Word A Meaning and usage of the word A

Word B Meaning and usage of the word B

Word C Meaning and usage of the word C

This is an example of how to provide meaning and usage information in correspondence with a word, namely the word and its meaning and usage are displayed in a line for each word.

In the conventional apparatus of this kind, however, since information on only one meaning and one usage is provided per word, the problem arises that much information on the original meanings and usage of a word has to be deleted to shorten the information, so that the details of the meanings and usage of the word are not displayed.

Further, if a display area is enlarged or small characters are used to express the meanings and usage to display all the information on the word, the amount of the information increases, making the displayed information hard to comprehend.

SUMMARY OF THE INVENTION

The present invention has been made in consideration of the above situation, and has as its objective to provide a sentence processing method and apparatus capable of concisely displaying information on a commonly misused word in a sentence so that a user can easily process the sentence on the basis of the provided information.

According to the present invention, the objective is attained by providing a sentence processing method comprising a first extracting step of extracting a possibly erroneous word from a sentence by analyzing the sentence in accordance with predetermined grammar and predetermined information on words; a second extracting step of extracting information on suggested words which correspond to the possibly erroneous word, extracted at the first extracting step, from the predetermined information on words; and a displaying step of displaying information on the possibly erroneous word which is extracted at the first extracting step, and the information on the corresponding suggested words which is extracted at the second extracting step.

The objective is also attained by providing a sentence processing apparatus comprising a first extracting means for extracting a possibly erroneous word from a sentence by analyzing the sentence in accordance with predetermined grammar and predetermined information on words; a second extracting means for extracting information on suggested words which correspond to the possibly erroneous word, extracted at said first extracting means, from the predetermined information on words; and a displaying means for displaying information on the possibly erroneous word which is extracted at the first extracting means, and the information on the corresponding suggested words which is extracted at the second extracting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows an example of contents of a word dictionary according to the embodiment of the present invention;

FIG. 6 shows an example of contents of a meaning and usage dictionary according to the embodiment of the present invention.

FIG. 7 is an explanatory view showing an example of an English sentence processing function according to the second embodiment of the present invention;

FIG. 8 shows an example of contents of a word dictionary in English according to the second embodiment of the present invention; and FIG. 9 shows an example of contents of a meaning and usage dictionary in English according to the second embodiment of the present invention.

DETAILED DESCRIPTION OF THE PREFERRED EMBODIMENTS

Preferred embodiments of the present invention will now be described in detail in accordance with the accompanying drawings.

<First embodiment>

A feature of an embodiment of the present invention is that a meaning and usage dictionary contains information, such as pronunciation(e.g., hiragana, phonetic symbols), representation (e.g., representation by Chinese characters, spelling), meanings, usage, synonyms, and so on, and, these items are stored in a form so that they can be recognized by their features. Further, the stored information is abstracted by picking up the designated items out of the meanings and usage information on words which are searched from the meaning and usage dictionary. Then, in displaying the usage information, the abstracted information or the full original information on the meanings and usage is provided to the user in accordance with necessity, thereby providing the information on the meanings and usage in a form that the information is easily understood by the user and does not lack in details.

The embodiment will be described in detail in accordance with the accompanying drawings.

Figure 1:
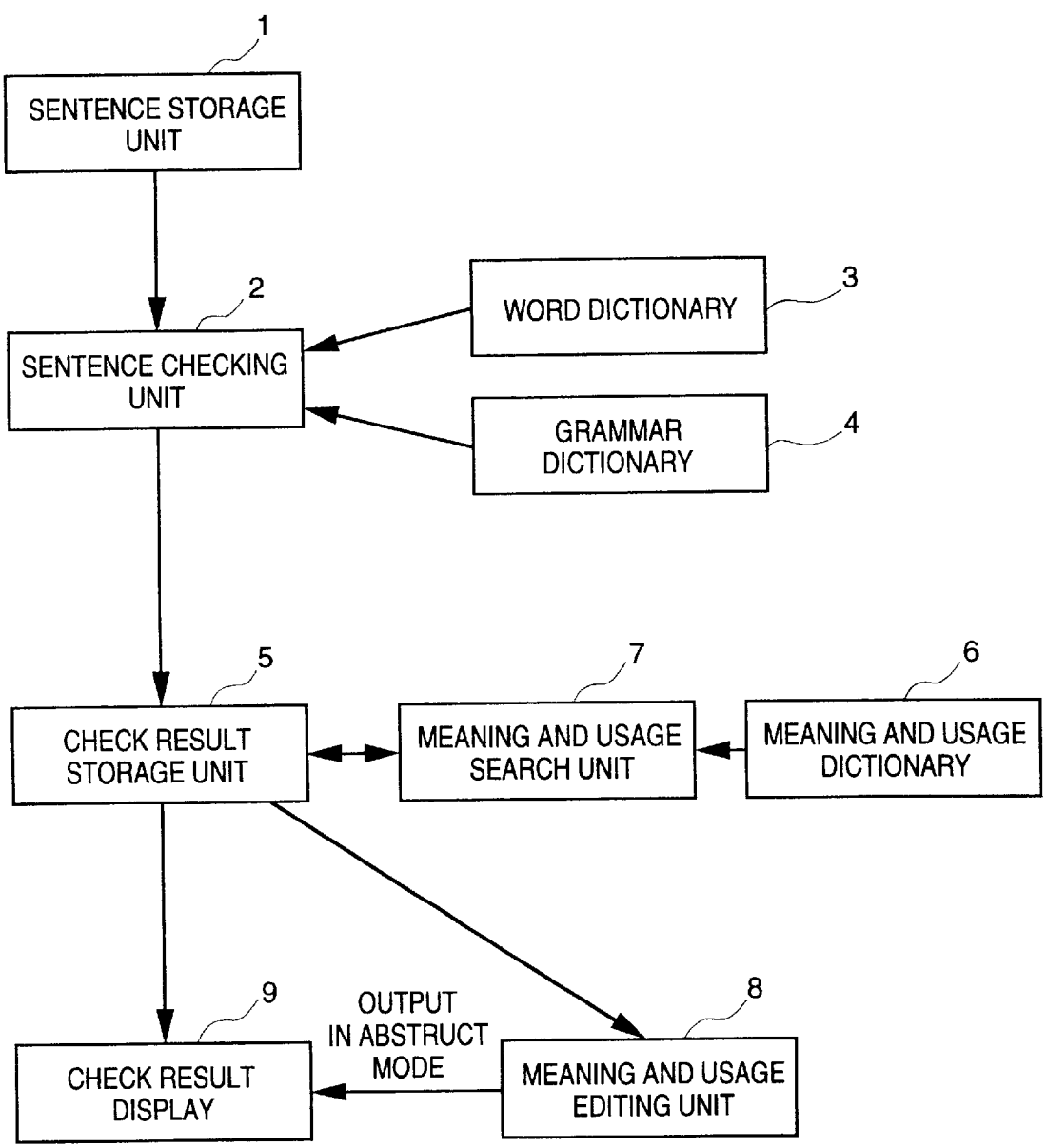
FIG. 1 is a block diagram illustrating a structure of functions according to an embodiment of the present invention.

FIG. 1 is a block diagram illustrating a basic structure of sentence processing functions of a sentence processing apparatus according to the embodiment of the present invention. In FIG. 1, reference numeral 1 denotes a sentence storage unit for storing sentences; 2 denotes a sentence checking unit for detecting a part which may contain an error in the sentence by analyzing the sentence stored in the sentence storage unit 1; 3 denotes a word dictionary used by the sentence checking unit 2; 4 denotes a grammar dictionary also used by the sentence checking unit 2; 5 denotes a check result storage unit for storing a result of the sentence checking unit 2; 6 denotes a meaning and usage dictionary for storing meanings and usage information on words; 7 denoted a meaning and usage search unit for searching the meaning and usage dictionary 6 for meanings and usage information on a word; 8 denotes a meaning and usage editing unit for editing the meanings and usage information on the word; and 9 denotes a check result display for displaying a word, which is detected in accordance with the check result stored in the check result storage unit 5, and suggested words as well as the meanings and usage information on the detected word and the suggested words.

Figure 2:
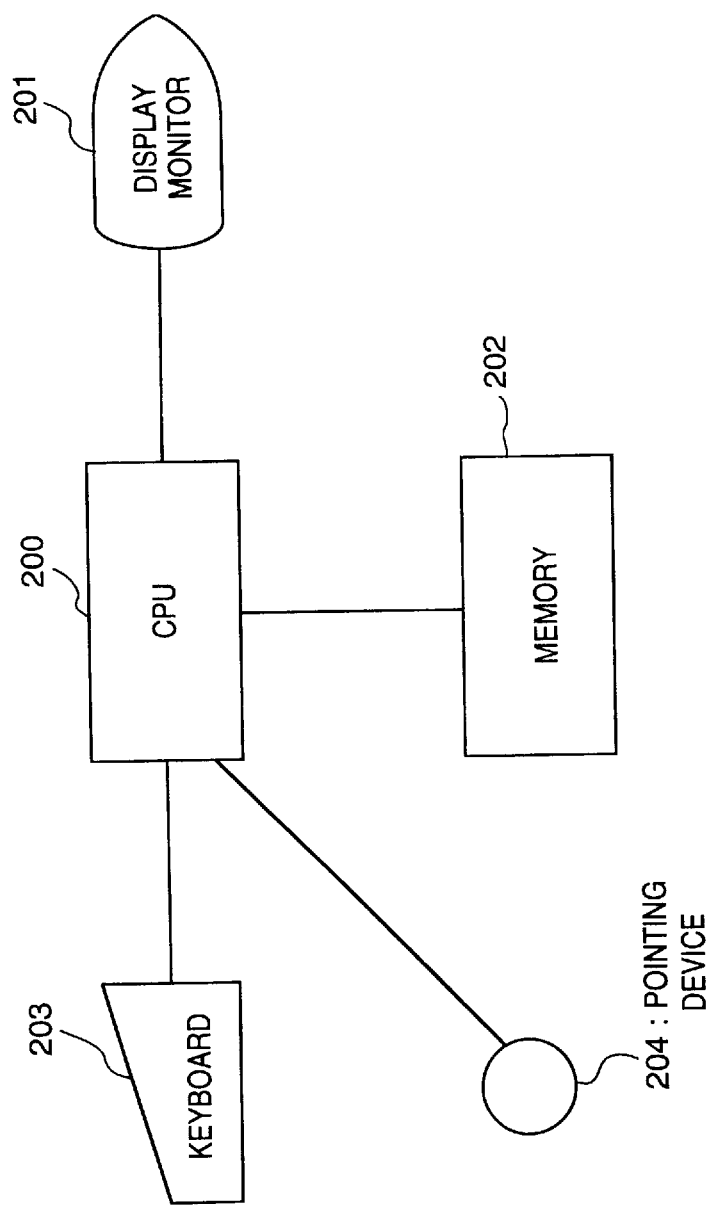
FIG. 2 is a block diagram illustrating a configuration of hardware according to the embodiment of the present invention.

FIG. 2 is a block diagram illustrating a configuration of a hardware of the sentence processing apparatus. Referring to FIG. 2, a CPU 200 performs the overall control of the sentence processing apparatus. A keyboard 203 and a pointing device 204 are for inputting a command and data for a sentence processing operation. A memory 202 has a secondary storage unit, ROM, and RAM. A display monitor 201 displays a processed result by the sentence processing apparatus, and the inputted command and data. The check result display 9 in FIG. 1 corresponds to the display monitor 201.

Figure 3:
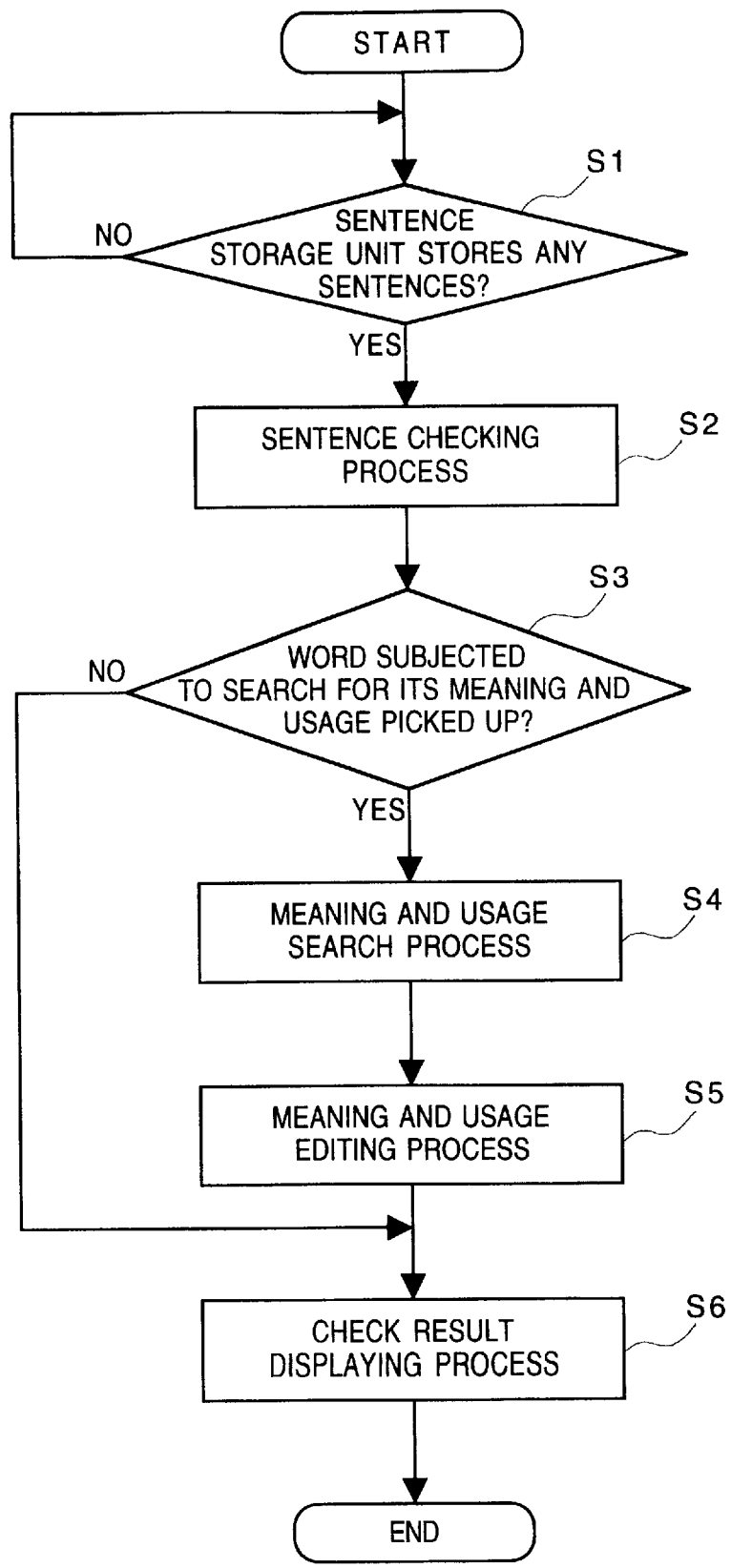
FIG. 3 is a flowchart showing an operational sequence according to the embodiment of the present invention.

FIG. 3 is a flowchart showing an example of an operational sequence in the structure of the sentence processing functions shown in FIG. 1. A program for a sentence processing, which corresponds to this flowchart, is stored in the memory 202 in advance, and the CPU 200 reads, interprets and executes this program.

Figure 4:
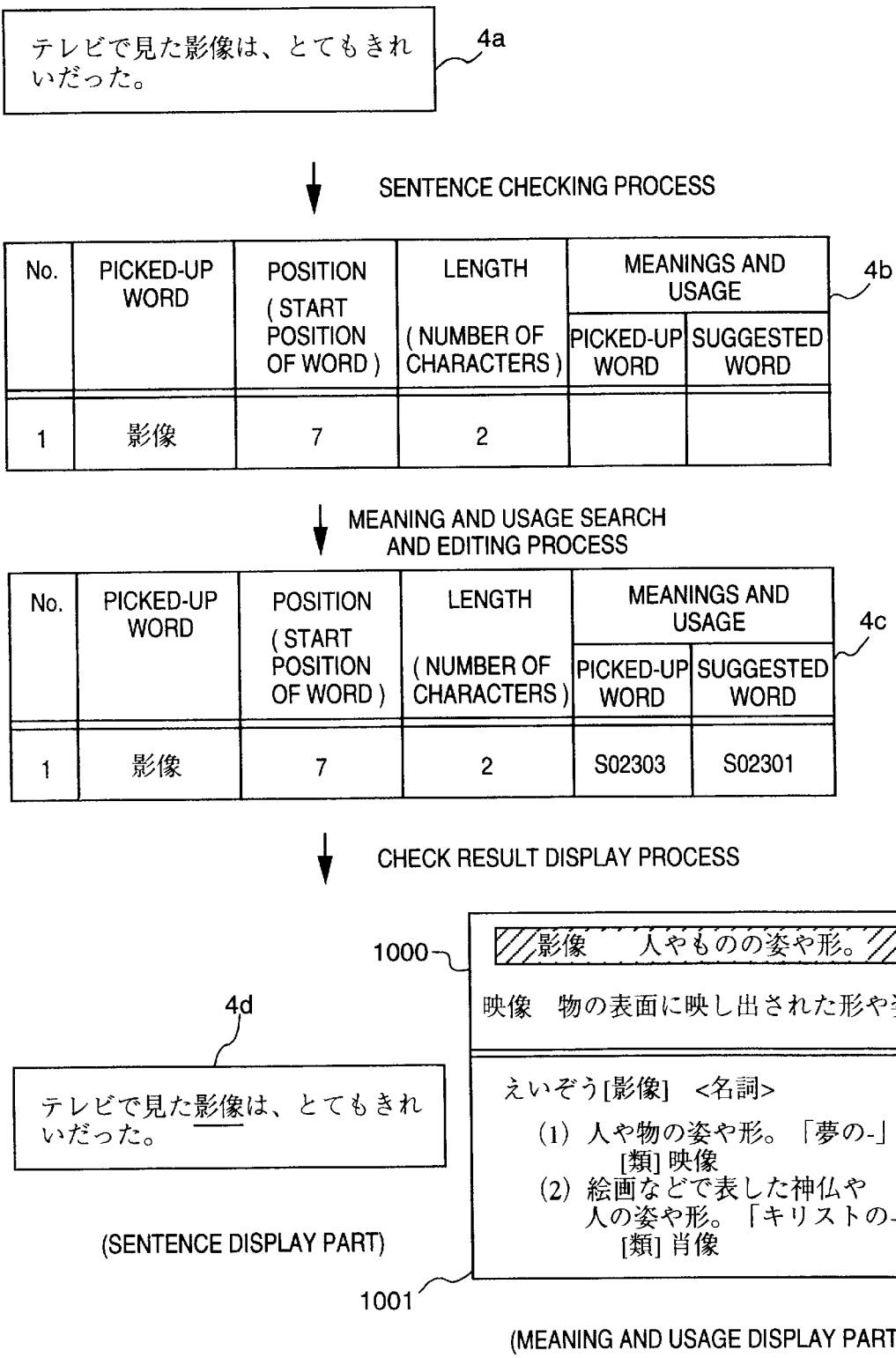
FIG. 4 is an explanatory view showing an example of a sentence processing function according to the embodiment of the present invention.

In order that the embodiment can be easily understood, an example of sentence in Japanese, which is shown by reference numeral 4a in FIG. 4 is used for explaining the operational sequence (shown in FIG. 3) by the sentence processing apparatus according to the embodiment of the present invention.

In FIG. 3, at step S1, whether the sentence storage unit 1 stores any sentences or not is checked. If it has not, the sentence processing apparatus waits until a sentence is inputted in the sentence storage unit 1. Whereas, if there is a sentence in the sentence storage unit 1, then the process proceeds to step S2. Note that a part of memory 202 is assigned to the sentence storage unit 1.

At step S2 a sentence checking process is applied to, the sentence stored in the sentence storage unit 1. This process is performed by the sentence checking unit 2 by using the word dictionary 3 (an example of the contents of the word dictionary is shown in FIG. 5) and the grammar dictionary 4, and various kinds of word information picked up by the sentence checking unit 2, such as the picked-up word (character compound word), the position of the picked-up word in the sentence, and the length of the word (number of characters composing the word), and so on, which are stored in the check result storage unit 5.

If an unidentified word in the sentence stored in the sentence storage unit 1 is found by the above process, the unidentified word is stored in the check result storage unit 5.

Note that a part of the memory 202 is assigned to the check result storage unit 5. The process to pick up the word at step S2 may be performed in such a manner that words are labeled with a predetermined mark (see FIG. 5 which is to be explained in detail later), stored in the word dictionary 3, for which homophones or synonyms tend to be misused in their place, and, when a word labeled with the mark is found in the sentence, then the word is picked up as an often misused word, namely a picked-up word. Then, the position of the picked-up word in the sentence and information on the word length are stored in a predetermined area of the check result storage unit 5.

Next at step S3, whether the check result storage unit 5 has stored a picked-up word, namely a word subjected to search for its meanings and usage, or not is checked, and if it has, the process proceeds to step S4 where a meaning and usage search process is performed. Whereas, if it has not, the process goes to step S6 where the unidentified words which have been stored in the check result storage unit 5 and an error-message relevant to the unidentified words are displayed on the check result display 9 (display monitor 201).

At step S4, the meaning and usage search unit 7 looks up the word which has been stored in the check result storage unit 5 and searches for its meanings and usage, in the meaning and usage dictionary 6 (structure of its contents is shown in FIG. 6), and adds the located information on the meanings and usage to the check result stored in the check result storage unit 5. As for the located information on the meanings and usage, meanings and usage of the word, synonyms of the word, and so on are included.

Next at step S5, on the basis of the check result stored in the check result storage unit 5, the meaning and usage editing unit 8 edits the meanings and usage information on the picked-up word and suggested words into an abstracted form (refer to reference numeral 1000 in FIG. 4) by picking up predetermined items out of the full information, and displays the edited information at step S6. A mode to output the edited information is called "simple display modem", hereinafter.

Here, when a command to display the full information (e.g., reference numeral 1001 in FIG. 4) of the meanings and usage of the picked-up word is inputted by a user, the full information is displayed on the check result display 9, then the processing is completed.

FIG. 5 is an example of the contents of the word dictionary 3. As shown in FIG. 5, the word reference numbers, i.e., "word No.", "representation" of the corresponding word (e.g., representation by Chinese characters), "pronunciation" (e.g., hiragana), "part of speech", "relevant word information (mark)" for showing whether or not there is a relevant word, "information on suggested words" used for checking a sentence, and so on, are stored in a form of a table.

Further, FIG. 6 shows an example of the contents of the meaning and usage dictionary 6. As shown in FIG. 6, the word reference numbers, i.e., "word No.", "pronunciation" (e.g., hiragana), "representation" of the corresponding word (e.g., Chinese characters), "part of speech", the reference numeral of a meaning, i.e., "meaning No." of the word, "meaning" of the corresponding word, "usage" of the word, "synonyms" of the word, and so on are stored in the form of a table.

Here, the word dictionary 3 shown in FIG. 5 includes all the words but not their meanings, whereas the meaning and usage dictionary 6 shown in FIG. 6 includes words and their meanings.

FIG. 4 is an example of the sentence processing in the embodiment when an example of an input sentence in Japanese, is processed. Here, when the input sentence 4a in FIG. 4 is applied to the sentence checking process (step S2 in FIG. 3), the word starting at the seventh characters in the sentence is picked up as a picked-up word, namely the word subjected to search for the meanings and usage, thereby obtaining a check result as an example 4b in FIG. 4.

Next, the meanings and usage search process (step S4) is performed by using the meaning and usage dictionary 6, and then the meanings and usage information on the picked-up word (meaning and usage No. S02303) and on meanings and usage of a suggested word (meaning and usage No. S02301) is added to the contents of the check result stored in the check result storage unit 5. An example of the contents of the added check result is referred to in 4c.

An example of the check result displayed in accordance with the contents of the added check result is referred by 4d, 1000, and 1001.

In a sentence display part 4d, the picked-up word is underlined, and in a meaning and usage display part, information on the abstracted meanings and usage of the picked-up word and a suggested word are displayed in the upper part (1000), and the full information on the meanings and usage of which is subjected to a full display of the meaning and usage is displayed in the lower part (1001).

In the above embodiment, the information to be stored in the meaning and usage dictionary, e.g., representation of a word, pronunciation, a part of speech, meaning No., meanings, and usage, is stored by each item, however the structure of the meaning and usage dictionary is not limited to this. For example, by placing a symbol "|" in between items, such as representation of a word, pronunciation, a part of speech, meaning No., meanings, and usage, so that each item can be separately recognized, these items can be stored as an integrated information of items (character information).

Further, in the case where information, such as representation of a word, pronunciation, a part of speech, meaning No., meanings, and usage, is stored in the meaning and usage dictionary it is explained in the above embodiment, however, the kinds of items of the information are not limited to these, and the meaning and usage dictionary may store other information, such as a antonym, comment on usage, area of usage, for example.

Furthermore, as the meaning and usage editing process, the first meaning of a word is selected in the above example. But the present invention is not limited to this, and any process may be possible as far as full original information on meanings and usage of a word is abstracted. For example, when the first meaning of a word consists of a plurality of sentences, the first sentence may be selected, or only usage in every meaning of the word may be collected to obtain abstracted information.

Further, the above embodiment is explained under the assumption that the meaning and usage dictionary is provided in the sentence processing apparatus in advance. It is also possible to construct the meaning and usage dictionary so as to enable the user to change and update it with new information on meanings and usage by a former user.

Further, the word dictionary which includes a picked-up word and suggested words and the grammar dictionary are used in the sentence checking process and a check result is displayed in the above embodiment, however, the present invention is not limited to this. For example, a dictionary for correction which includes only a picked-up word and suggested words may be prepared, the sentence may be checked by word-pattern matching, and the meanings and usage of the words may be displayed.

Further, the check result display shows a part which is picked-up at the sentence checking process by putting an underline thereon, however, the present invention is not limited to this, and any method of high-lighting the picked-up part can be used as far as a user is able to recognize the picked-up part. For example, the part may be high-lighted by using a different color or different font, or the existence of such a part may be indicated by using sound.

Further, the aforesaid embodiment is explained by using Japanese, however, the present invention is applicable to any kinds of languages, such as English and German. In particular, the case of English will be described in detail later in the second embodiment.

According to the aforesaid embodiment as described above, information on various kinds of items, such as phonetic representation, representation of a word, meanings, usage, synonyms, may be stored in a meaning and usage dictionary in a form so that the items are distinguished with one another, only the designated items are selected out of the information on meanings and usage which are looked up from the meaning and usage dictionary, and edited into abstracted information, then either the abstracted information or the original full information on the meanings and usage is displayed necessarily in displaying the information of the meaning and usage. Thereby, it is possible to provide information on meanings and usage in a form that is easily understood by the user and does not lack details of the information, and consequently, proofreading of a document can be performed effectively and concisely.

Further, according to the aforesaid embodiment as described above, it is possible to display information on a word which tends to be misused in a sentence in the simple display mode, and a user can perform an editing process in response to the displayed information.

<Second embodiment>

The first embodiment according to this invention shows how to deal with Japanese lines, basically. In contrast to Japanese lines, the second embodiment below according to this invention will describe how to deal with English lines and is referred to FIG. 7, FIG. 8 and FIG. 9.

The processing structure of this second embodiment basically is the same as that of the first embodiment as shown in FIG. 1 through FIG. 3.

However, there are several difference between the first and second embodiments in terms of different features of Japanese and English lines. First of all, FIG. 8, which illustrates an example of a word dictionary in English in the second embodiment corresponding to word dictionary 3 in FIG. 1, shows the second item of the table, that is "spelling", from that of in FIG. 5 which is "representation" in the first embodiment.

Secondly, the third item in both of the tables in FIG. 8 and FIG. 5 is titled the same, "pronunciation". These contents are slightly different from each other, that is, "Hiragana" as a way to show pronounciation is arranged in FIG. 5 and "phonetic symbol" as a way to show pronounciation is arranged in FIG. 8.

Thirdly, the second item in the meaning and usage dictionary 6 in FIG. 6 according to the first embodiment, is "pronounciation" described using "Hiragana", and in contrast to that the meaning and usage dictionary 6 in FIG. 9 according to the second embodiment is "spelling" of an English word.

The second embodiment will be described in detail in accordance with the accompanying drawings.

In order that the second embodiment can be easily understood, an example sentence in English, "The house built on lock is large" which is shown by reference numeral 7a in FIG. 7 is used for explaining the operational sequence (shown in FIG. 3) in terms of English lines by the sentence processing apparatus according to the embodiment of the present invention.

In FIG. 3, at step S1, whether the sentence storage unit 1 stores any English sentences or not is checked. If it has not, the sentence processing apparatus waits until an English sentence is inputted in the sentence storage unit 1. Whereas, if there is an English sentence in the sentence storage unit 1, then the process proceeds to step S2.

At step S2, the English sentence stored in the sentence storage unit 1 is applied with an English sentence checking process. This process is performed by the sentence checking unit 2 by using the word dictionary 3 (an example of the contents of the word dictionary is shown in FIG. 8) and the grammar dictionary 4, and various kinds of word information picked up by the sentence checking unit 2, such as the picked-up word (character composition of the word), the position of the picked-up word in the English sentence, and the length of the word (number of characters composing the word), and so on, which are stored in the check result storage unit 5.

If an unidentified word in the English sentence stored in the sentence storage unit 1 is found by the above process, the unidentified word is stored in the check result storage unit 5.

Note that a part of the memory 202 is assigned to the check result storage unit 5. The process to pick up the word at step S2 may be performed in such a manner that words are labeled with a predetermined mark (see FIG. 8, which is to be explained in detail later as "relevant word information"), stored in the word dictionary 3, which tend to be misused as a similar spelled word, and, when a word labeled with the mark is found in the English sentence, then the word is picked up as an often misused word, namely a "picked-up word". Then, the position of the picked-up word in the English sentence and information on the word length are stored in a predetermined area of the check result storage unit 5.

Next at step S3, whether the check result storage unit 5 has stored a picked-up word, namely a word subjected to search for its meanings and usage, or not is checked, and if it has, the process proceeds to step S4 where a meaning and usage search process is performed. Whereas, if it has not, the process goes to step S6 where the unidentified words which have been stored in the check result storage unit 5 and an error-message relevant to the unidentified word are displayed on the check result display 9 (display monitor 201).

At step S4, the meaning and usage search unit 7 looks up the word which has been stored in the check result storage unit 5 and searches for its meanings and usage, in the meaning and usage dictionary 6 (structure of its contents is shown in FIG. 9), and adds the located information on the meanings and usage to the check result stored in the check result storage unit 5. As for the located information on the meanings and usage, meanings and usage of the word, synonyms of the word, and so on are included.

Next at step S5, on the basis of the check result stored in the check result storage unit 5, the meaning and usage editing unit 8 edits the meanings and usage information on the picked-up word and suggested words into an abstracted form (refer to reference numeral 2000 in FIG. 7) by picking up predetermined items out of the full information, and displays the edited information at step S6.

Here, when a command to display the full information (e.g., reference numeral 2001 in FIG. 7) of the meanings and usage of the picked-up word is inputted by a user, the full information is displayed on the check result display 9, then the processing is completed.

FIG. 8 is an example of the contents of the word dictionary 3 in terms of English. As shown in FIG. 8, the word reference numbers, i.e., "word No.", "spelling" of the corresponding word, "pronunciation", namely, phonetic symbol, "part of speech", "relevant word information (mark)" for showing whether or not there is a relevant word, "information on suggested words" used for checking an English sentence, and so on, are stored in a form of a table.

Further, FIG. 9 shows an example of the contents of the meaning and usage dictionary 6 in terms of English. As shown in FIG. 9, the word reference numbers, i.e., "word No.", "spelling", "pronunciation" of the corresponding word (e.g., phonetic symbol), "part of speech", the reference numeral of a meaning, i.e., "meaning No." of the word, "meaning" of the corresponding word, "usage" of the word, "synonyms" of the word, and so on are stored in a form of a table.

Here, the word dictionary 3 in English shown in FIG. 8 includes all the words but not their meanings, whereas the meaning and usage dictionary 6 in English shown in FIG. 9 includes words and their meanings.

FIG. 7 is an example of the English sentence processing in the second embodiment when an example of an input English sentence, "The house built on lock is large" is processed. Here, when the input English sentence 7a in FIG. 7 is applied to the sentence checking process (step S2 in FIG. 3), the word starting at the twentieth characters in the English sentence is picked up as a picked-up word, namely the word subjected to search for the meanings and usage, thereby obtaining a check result as an example 7b in FIG. 7.

Next, the meanings and usage search process (step S4) is performed by using the meaning and usage dictionary 6 in English, then the meanings and usage information on the picked-up word "lock" (meaning and usage No. s003701) and on meanings and usage of a suggested word "rock" (meaning and usage No. s006503) is added to the contents of the check result stored in the check result storage unit 5. An example of the contents of the added check result is referred to in 7c.

An example of the check result displayed in accordance with the contents of the added check result is referred to in 7d, 2000, and 2001.

In an English sentence display part 7d, the picked-up word "lock" is underlined, and in a meaning and usage display part, information on the abstracted meanings and usage of the picked-up word "lock" and a suggested word "rock" are displayed in the upper part (2000), and the full information on the meanings and usage of "lock", which is subjected to full display of the meaning and usage, is displayed in the lower part (2001).

In the second embodiment, the information to be stored in the meaning and usage dictionary, e.g., spelling of a word, pronunciation, a part of speech, meaning No., meanings, usage and synonyms, is stored by each item, however the structure of the meaning and usage dictionary in English is not limited to this. For example, by placing a symbol "|", between items, such as spelling of a word, pronunciation, a part of speech, meaning No., meanings, usage and synonyms, so that each item can be separately recognized, these items can be stored as an integrated information of items.

Further, in the case where information, such as spelling of a word, pronunciation, a part of speech, meaning No., meanings, usage and synonyms, is stored in the meaning and usage dictionary is explained in the second embodiment, however, the kinds of items of the information are not limited to these, and the meaning and usage dictionary may store other information, such as a antonym, comment on usage, area of usage, for example.

Furthermore, as the meaning and usage editing process in terms of input English lines, the first meaning of a word is selected in the above example, however, the present invention is not limited to this, and any process may be possible as far as full original information on meanings and usage of a word is abstracted. For example, when the first meaning of a word consists of a plurality of English sentences, the first English sentence may be selected, or only usage in every meaning of the word may be collected to obtain abstracted information.

Further, the second embodiment is explained under the assumption that the meaning and usage dictionary in English is provided in the sentence processing apparatus in advance. It is also possible to make the meaning and usage dictionary so as to enable the user to change and update it with new information on meanings and usage by a former user.

Further, the word dictionary in English which includes a picked-up word and suggested words and the grammar dictionary in English are used in the sentence checking process and a check result is displayed in the second embodiment, however, the present invention is not limited to this. For example, a dictionary for correction which includes only a picked-up word and suggested words may be prepared, the English sentence may be checked by word-pattern matching, and the meanings and usage of the words may be displayed.

Further, the check result display shows a part which is picked-up at the sentence checking process by putting an underline thereon, however, the present invention is not limited to this, and any method of high-lighting the picked-up part can be used as far as a user is able to recognize the picked-up part. For example, the part may be high-lighted by using a different color or different font, or the part may be notified by using sound.

Further, the second embodiment is explained by using English, however, the present invention is applicable to any kinds of languages, such as Spanish and German.

According to the second embodiment as described above, English information on various kinds of items, such as pronunciation, spelling, meanings, usage, synonyms, may be stored in a meaning and usage dictionary in a form so that the items are distinguished with one another, only the designated items are selected out of the information on meanings and usage which are looked up from the meaning and usage dictionary, and edited into abstracted information, then either the abstracted information or the original full information on the meanings and usage is displayed necessarily in displaying the information of the meaning and usage. Thereby, it is possible to provide information on meanings and usage in a form that is easily understood by the user and does not lack details of the information, and consequently, proofreading of a document can be performed effectively and concisely.

Further, according to the second embodiment as described above, it is possible to display information on a word which tends to be misused in an English sentence in a simple form, and a user can perform an editing process in response to the displayed information.

The present invention can be applied to a system constituted by a plurality of devices or to an apparatus comprising a single device.

Further, the object of the present invention can also be achieved by providing a storage medium storing data of the aforementioned dictionaries and program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the data and the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used to provide the data and the program codes.

In addition to the aforesaid functions according to the above embodiments which are realized by executing the program codes and read by a computer, the present invention accommodates the case where an OS (operating system) or the like working on the computer performs a part of a process or entire processes in accordance with designations of the program codes and realizes functions according to the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A sentence processing method comprising:

a searching step of searching for a possibly erroneous word from a sentence by analyzing the sentence by referring to a first dictionary including information representing whether or not each word is possibly erroneous and suggested words corresponding to the possibly erroneous word;

a retrieving step of retrieving plural kinds of linguistic information with respect to the possibly erroneous word and each suggested word corresponding thereto found in said searching step, from a second dictionary including the plural kinds of linguistic information on words;

an extracting step of extracting a predetermined kind of linguistic information on the possibly erroneous word and each of the suggested words from the plural kinds of linguistic information on the possibly erroneous word and the suggested words retrieved in said retrieving step;

a first displaying step of displaying the possibly erroneous word and the corresponding suggested words with the predetermined kind of linguistic information thereon extracted in said extracting step;

a designating step of designating one word from among the possibly erroneous word and the corresponding suggested words displayed in said first displaying step; and a second displaying step of displaying the entire plural kinds of linguistic information on the word designated in said designating step together with the information displayed in said first displaying step.

2. The sentence processing method according to claim 1, wherein the information on the possibly erroneous word includes a possibly erroneous word and a first mark used for identifying the possibly erroneous word in the sentence.

3. The sentence processing method according to claim 1, wherein the plural kinds of linguistic information on a word includes a written representation of the word.

4. The sentence processing method according to claim 3, wherein the written representation includes a Kanji form representation.

5. The sentence processing method according to claim 3, wherein the written representation includes spelling.

6. The sentence processing method according to claim 1, wherein the plural kinds of linguistic information on a word includes the meanings of the word.

7. The sentence processing method according to claim 1, wherein the plural kinds of linguistic information on a word includes the usage of the word.

8. The sentence processing method according to claim 1, wherein the plural kinds of linguistic information on a word includes a comment on the usage of the word.

9. The sentence processing method according to claim 1, wherein the plural kinds of linguistic information on a word includes the area of usage of the word.

10. The sentence processing method according to claim 1, wherein the plural kinds of linguistic information on a word includes a synonym of the word.

11. The sentence processing method according to claim 1, wherein the plural kinds of linguistic information on a word includes an antonym of the word.

12. The sentence processing method according to claim 1, wherein a word is labelled with a second mark for which another word is often misused in its place, in advance, within the first dictionary, and at said searching step, each word in the sentence is compared with a word included in the first dictionary, then if a word in the sentence is matched to the word labeled with the second mark, the matched word is found to be the possibly erroneous word.

13. The sentence processing method according to claim 1, wherein the first dictionary includes a written representation of each word.

14. The sentence processing method according to claim 13, wherein the written representation includes a Kanji form representation.

15. The sentence processing method according to claim 13, wherein the written representation includes spelling.

16. The sentence processing method according to claim 1, wherein the first dictionary includes a phonetic representation of each word.

17. The sentence processing method according to claim 1, wherein the first dictionary includes a part of speech of each word.

18. The sentence processing method according to claim 2, wherein the first mark is an underline.

19. The sentence processing method according to claim 2, wherein the first mark is a predetermined color.

20. The sentence processing method according to claim 2, wherein the first mark is displayed in a font of the possibly erroneous word which is different from a font of other words.

21. The sentence processing method according to claim 1, wherein the predetermined kind of linguistic information includes a first meaning of each word.

22. A sentence processing apparatus comprising:
a searching means for searching for a possibly erroneous word from a sentence by analyzing the sentence by referring to a first dictionary including information representing whether or not each word is possibly erroneous and suggested words corresponding to the possibly erroneous word;
retrieving means for retrieving plural kinds of linguistic information with respect to the possibly erroneous word and each suggested word corresponding thereto found by said searching means, from a second dictionary including the plural kinds of linguistic information on words;
extracting means for extracting a predetermined kind linguistic information on the possibly erroneous word and each of the suggested words from the plural kinds of linguistic information on the possibly erroneous word and the suggested words retrieved bv said retrieving means;
first displaying means for displaying the possibly erroneous word and the corresponding suggested words with the predetermined kind of linguistic information thereon extracted by said extracting means;
designating means for designating one word from among the possibly erroneous word and the corresponding suggested words displayed by said first displaying means; and
second displaying means for displaying the entire plural kinds of linguistic information on the word designated by said designating means together with the information displayed bv said first displaying means.

23. The sentence processing apparatus according to claim 22, wherein the information on the possibly erroneous word includes a possibly erroneous word and a first mark used for identifying the possibly erroneous word in the sentence.

24. The sentence processing apparatus according to claim 22, wherein the plural kinds of linguistic information on a word includes a written representation of the word.

25. The sentence processing apparatus according to claim 24, wherein the written representation includes a Kanji form representation.

26. The sentence processing apparatus according to claim 24, wherein the written representation includes spelling.

27. The sentence processing apparatus according to claim 22, wherein the plural kinds of linguistic information on a word includes the meanings of the word.

28. The sentence processing apparatus according to claim 22, wherein the plural kings of linguistic information on a word includes the usage of the word.

29. The sentence processing apparatus according to claim 22, wherein the plural kinds of linguistic information on a word includes a comment on the usage of the word.

30. The sentence processing apparatus according to claim 22, wherein the plural kinds of linguistic information on a word includes the area of usage of the word.

31. The sentence processing apparatus according to claim 22, wherein the plural kinds of linguistic information on a word includes a synonym of the word.

32. The sentence processing apparatus according to claim 22, wherein the plural kinds of linguistic information on a word includes an antonym of the word.

33. The sentence processing apparatus according to claim 22, wherein a word is labelled with a second mark for which another word is often misused in its place, in advance, within the first dictionary, and said searching means compares each word in the sentence with a word included in the first dictionary, then if a word in the sentence is matched to the word labeled with the second mark, the matched word is found to be the possibly erroneous word.

34. The sentence processing apparatus according to claim 22, wherein the first dictionary includes a written representation of each word.

35. The sentence processing apparatus according to claim 34, wherein the written representation includes a Kanji form representation.

36. The sentence processing apparatus according to claim 34, wherein the written representation includes spelling.

37. The sentence processing apparatus according to claim 22, wherein the first dictionary includes a phonetic representation of each word.

38. The sentence processing apparatus according to claim 22, wherein the first dictionary includes a part of speech of each word.

39. The sentence processing apparatus according to claim 23, wherein the first mark is an underline.

40. The sentence processing apparatus according to claim 23, wherein the first mark is a predetermined color.

41. The sentence processing apparatus according to claim 23, wherein the first mark is displayed in a font of possibly erroneous word which is different from a font of other words.

42. The sentence processing method according to claim 22, wherein the predetermined kind of linguistic information includes a first meaning of each word.

43. A computer usable medium having computer readable program means for causing a computer to process a sentence, the computer readable program code means comprising:

first computer readable program code means for causing the computer to search for a possibly erroneous word from the sentence by analyzing the sentence by referring to a first dictionary including information representing whether or not each word is possibly erroneous and suggested words, corresponding to the possibly erroneous word;

second computer readable program code means for causing the computer to retrieve plural kinds of linguistic information with respect to the possibly erroneous word and each suggested word corresponding thereto caused to be found by said first computer readable program code means from a second dictionary including the plural kinds of linguistic information on words;

third computer readable program code means for causing the computer to extract a predetermined kind of linguistic information on the possibly erroneous word and each of the suggested words from the plural kinds of linguistic information on the possibly erroneous word and the suggested words caused to be retrieved by said second computer readable program code means;

fourth computer readable program code means for causing the computer to display the possibly erroneous word and the corresponding suggested words with the predetermined kind of linguistic information thereon caused to be extracted by said third computer readable program code means;

fifth computer readable program code means for causing the computer to designate one word from among the possibly erroneous word and the corresponding suggested words caused to be displayed by said fourth computer readable program code means; and sixth computer readable program code means for causing the computer to display the entire plural kinds of linguistic information on the word caused to be designated by said fifth computer readable program code means together with the information caused to be displayed by said fourth computer readable program code means.

\* \* \* \* \*

UNITED STATES PATENT AND TRADEMARK OFFICE
CERTIFICATE OF CORRECTION

PATENT NO. : 5,890,182
DATED : March 30, 1999
INVENTOR(S) : TSUYOSHI YAGISAWA, ET AL.

It is certified that error appears in the above-identified patent and that said Letters Patent is hereby corrected as shown below:

ON THE COVER PAGE, At [30] FOREIGN APPLICATION PRIORITY DATA

"7-040014" should read --7-040114--.

COLUMN 3

Line 15, "denoted" should read --denotes--.
Line 42, "Japanese, which" should read
-- テレビで見た影像は、とてもきれいだった。 --.

Line 54, "S2 a" should read --S2,a--, and "to," should read --to--.

COLUMN 4

Line 37, "modem"," should read --mode,"--.
Line 67, "Japanese," should read --Japanese,
-- テレビで見た影像は、とてもきれいだった。 --.

UNITED STATES PATENT AND TRADEMARK OFFICE
CERTIFICATE OF CORRECTION

PATENT NO. : 5,890,182
DATED : March 30, 1999
INVENTOR(S) : TSUYOSHI YAGISAWA, ET AL.

It is certified that error appears in the above-identified patent and that said Letters Patent is hereby corrected as shown below:

COLUMN 5

Line 10, "word (meaning" should read --word "影像" (meaning--.
Line 11, "word (meaning" should read --word "映像" meaning--.
Line 18, "word is" should read --word "影像" is--.
Line 21, "word and" should read --word "影像" and--, and "word are" should read --word "映像" are--.
Line 23, "of which" should read --of "影像" which--.
Line 42, "a" should read --an--.

COLUMN 6

Line 40, "to FIG. 7," should read --to in FIG. 7,--.

COLUMN 7

Line 1, "large" which" should read --large "¶ which--.

UNITED STATES PATENT AND TRADEMARK OFFICE
CERTIFICATE OF CORRECTION

PATENT NO. : 5,890,182
DATED : March 30, 1999
INVENTOR(S) : TSUYOSHI YAGISAWA, ET AL.   Page 3 of 3

It is certified that error appears in the above-identified patent and that said Letters Patent is hereby corrected as shown below:

COLUMN 8

Line 27, "large"is" should read --large "¶ is--.
    Line 30, "characters" should read --character--.

COLUMN 9

Line 44, "usage," should read --usage, and--.

COLUMN 12

Line 1, "kind" should read --kind of--.
    Line 35, "kings" should read --kind--.

COLUMN 14

Line 18, "word" should read --words--.

Signed and Sealed this

Twenty-first Day of November, 2000

Q. TODD DICKINSON

Attest:

Attesting Officer    Director of Patents and Trademarks